Feb. 6, 1934.  P. S. STRANG  1,945,832
ILLUMINATING APPARATUS
Filed Dec. 11, 1931  2 Sheets-Sheet 1
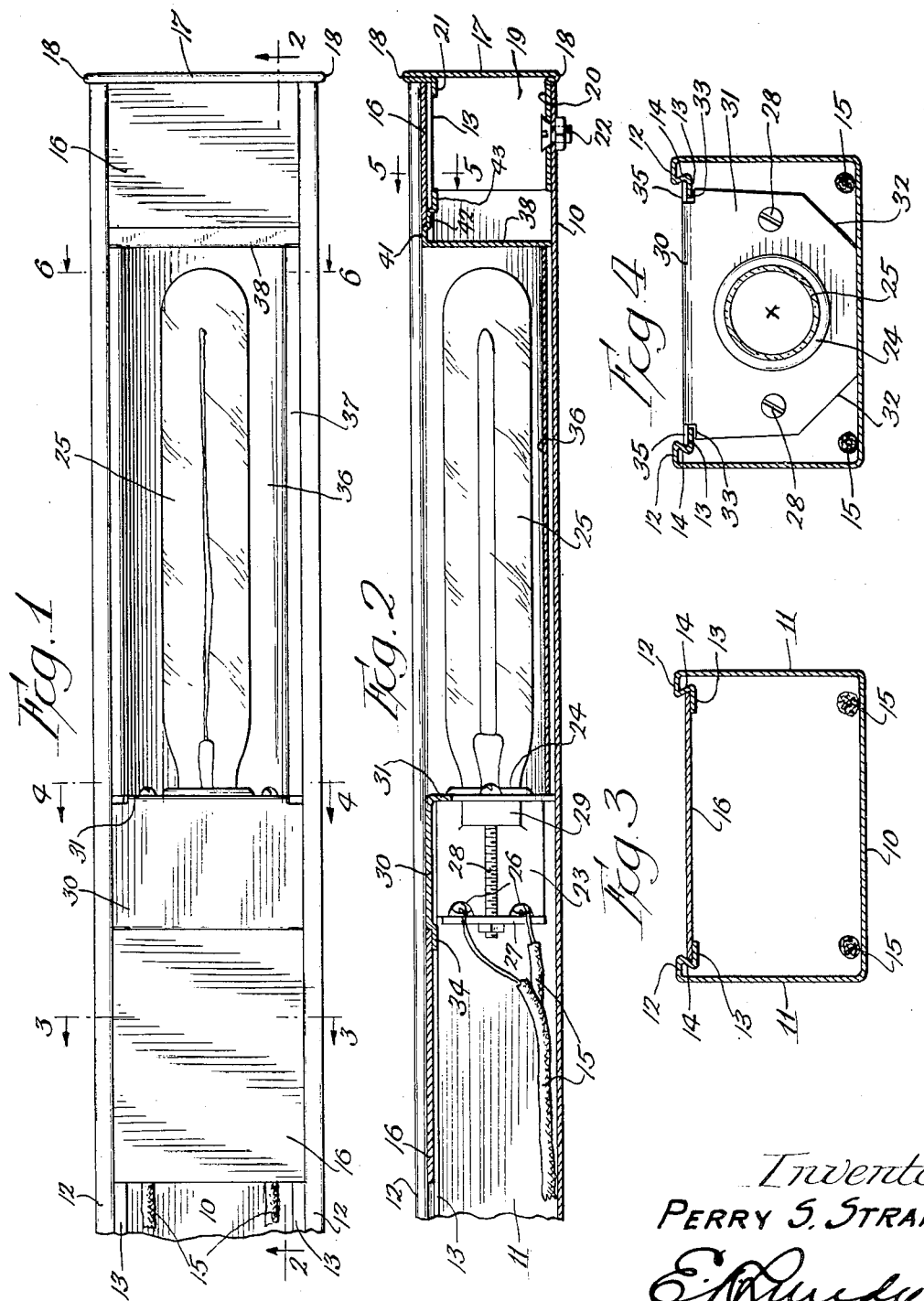
Inventor
PERRY S. STRANG

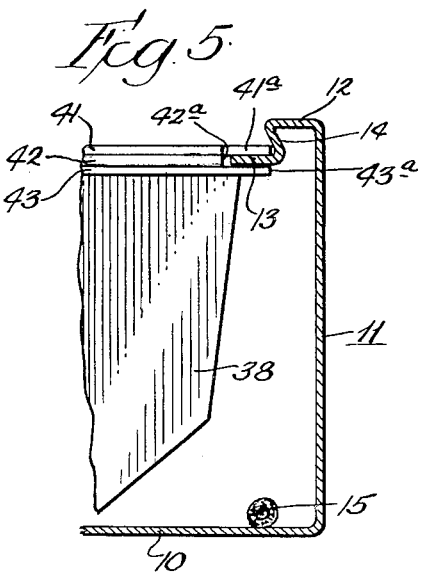
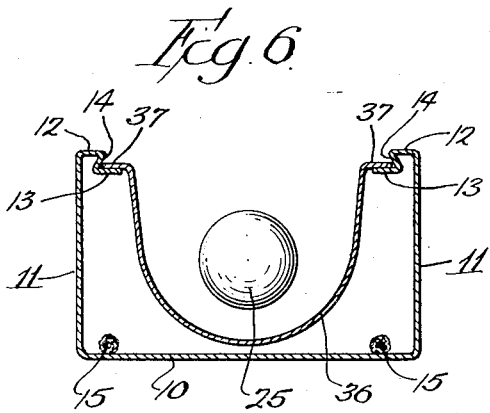
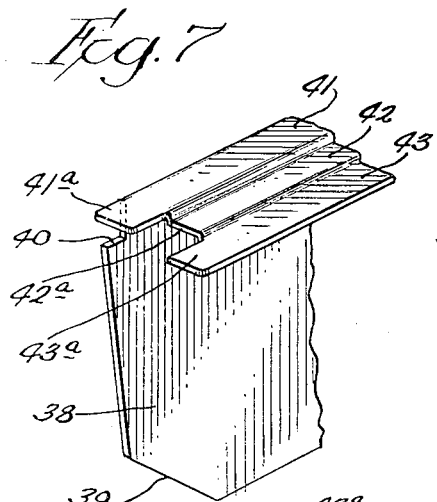
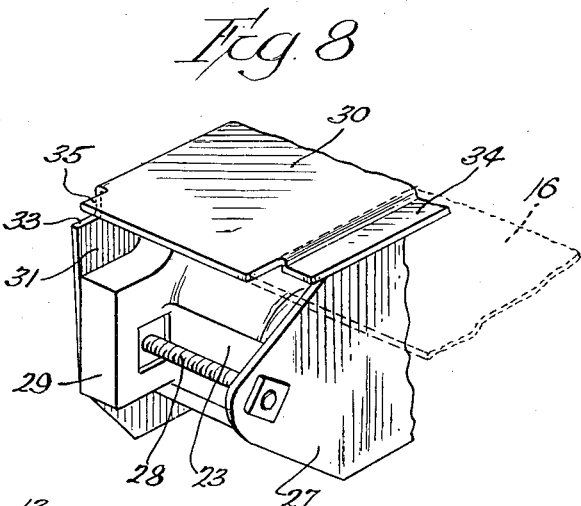
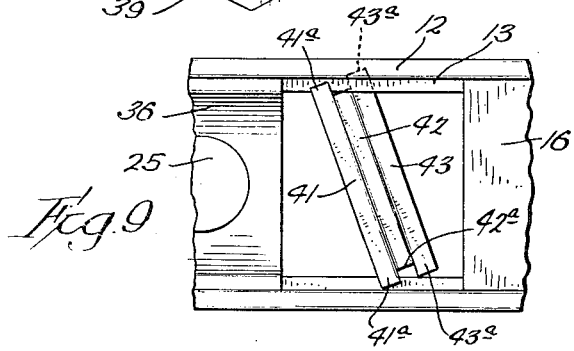

Patented Feb. 6, 1934

1,945,832

UNITED STATES PATENT OFFICE 1,945,832

ILLUMINATING APPARATUS

Perry S. Strang, Chicago, Ill.

Application December 11, 1931
Serial No. 580,272

10 Claims. (Cl. 240—6)

This invention relates generally to the art of illumination and it has more particular reference to a structure providing for the use of multiple lamps arranged in a conduit or trough-like housing where they are associated with reflecting means for directing light rays out through an opening in the conduit. In the above-mentioned structure, when made in accordance with my invention, the parts are made interchangeable thereby providing for the positioning of the lamps at different locations in the conduit. The interchangeable elements are made in such manner that they may be readily assembled with or disassembled from the conduit without removing any or all of the other elements. In combination with the above-mentioned structure I have also provided a simple means for closing certain portions of the conduit in which the electric conductors are placed and housing all the parts excepting the lamps and reflectors.

In devising the present structure, one of the objects in mind is to provide a conduit that may be made in different lengths so that lamps may be spaced at any distance apart that may be desired and the elements, such as the socket unit, the reflector, the partition wall and the conduit closure plates may be carried in stock and supplied in any quantity desired according to the number of units required for the length of conduit and depending upon the illumination desired. This provides an illuminating device that is of knock-down construction, all of the parts of which may be sold separately and in required quantities.

Other objects of my invention reside in providing an illuminating structure that is extremely compact when the parts are assembled so that all of the parts are housed within a relatively small trough-shaped conduit. The conduit may be made of any desired cross-sectional shape and dimensions so that it may be utilized for installation in or adjacent the ceiling of the store window, at a convenient location in a show case, within the molding or upper corners of a room or apartment, and in any other suitable manner.

Further objects of my invention reside in providing a lighting fixture, in the form of a strip, that is novel and compact in construction; that is effective in performing the functions for which it is designed; which is made of sturdy parts to provide durability that will withstand hard usage; and which may be economically produced so that it may be placed upon the market for a reasonable retail price.

I prefer to carry out my invention, and to accomplish the above enumerated objects, in substantially the manner hereinafter fully described and as more particularly pointed out in the claims, reference being made to the accompanying drawings that form a part of this specification.

In the drawings:—

Figure 1 is a longitudinal view of the lighting or illuminating device looking toward the open side of the conduit and showing a group of units and elements in assembly.

Figure 2 is a longitudinal section of the structure shown in Figure 1, the view being taken on line 2—2 thereof and looking in the direction of the arrows.

Figure 3 is a vertical transverse section on line 3—3 of Figure 1 looking in the direction of the arrows and showing the assembly of the closure plate with the conduit.

Figure 4 is a vertical transverse section on line 4—4 of Figure 1 looking in the direction of the arrows and showing the assembly of the socket unit with the conduit.

Figure 5 is a vertical transverse section on line 5—5 of Figure 2, partly broken away, and showing the assembly of the partition wall with the conduit.

Figure 6 is a vertical transverse section on line 6—6 of Figure 1 showing the assembly of the reflector unit with the conduit.

Figure 7 is a perspective view of a portion of the partition wall, drawn to an enlarged scale, and showing the detailed formation thereof.

Figure 8 is a perspective view, somewhat enlarged, of a portion of the socket unit and showing the detailed construction thereof.

Figure 9 is a detail view illustrating the manner of readily removing one of the interchangeable units.

The drawings are to be understood as being more or less schematic and are for the purpose of disclosing a typical or preferred embodiment of my invention. In said drawings similar reference characters have been employed to designate like parts wherever they may appear in the several views.

The structure which I have devised consists of a trough-shaped conduit formed of metal that is bent a desired shape to house the units or parts, and it has an opening in one side, and there are guide flanges along the edges of this opening that is adapted to interlock with suitably shaped lugs or lips on the units housed within the conduit. The manner of constructing and mounting the units or parts permits them to be moved longitudinally on the guide flanges to different positions, and it also permits certain of the units to be removed or replaced without removing the other units. By this novel arrangement the conduit may be supplied in long strips with a supply of units and the user may purchase any desired length of conduit and assemble the units in such spaced order as his requirements may dictate.

Referring to the drawings it will be seen the conduit is formed trough-shape by providing a strip or sheet of metal that is bent U-shaped in cross-section thus providing a bottom wall 10, longitudinal parallel side walls 11 disposed at right angles thereto, and at the upper edges of the side walls the metal is bent inwardly to provide the guide flanges for receiving the units or accessories. The guides may be of any desired formation, and as shown they consist of horizontal flanges 12 that project towards each other from the upper edges of the side walls 11 and are then bent inside the housing or conduit to provide V-shaped grooves as shown.

The lower flanges 13 of the V-shaped grooves are preferably in substantially horizontal planes and project towards each other while the other flanges 14 extend downwardly from the edges of the first flanges 12, oblique thereto, and diverge outwardly toward the side walls 11. The electric conductors or wires 15 are disposed in the bottom of this conduit, preferably in the longitudinal corners formed by the juncture of the bottom and side walls 10 and 11, and the conductors are connected at suitable places along their length to the electrical outlet members as hereinafter described.

It will be seen that the trough-like conduit has a longitudinal opening in its upper portion that provides access to the interior and the flanges 12, 13 and 14 provide means whereby the other portions of the structure may be movably interlocked with the conduit. Between the electrical or other units it is preferred to close the opening in the conduit and this is done by means of flat closure plates 16 that are inserted into the grooves formed by the flanges at the outer edges of side walls 12. On account of the fact that the lengths of the opening to be closed by the cover plates may vary it is preferred to provide a long strip of metal of the desired width to fit into the opening as shown in the drawings and to cut such strip in the desired length to fit between the units as will be noted by the reference to the opposite end portions of Figure 1.

The metal forming the trough-shaped conduit is more or less elastic or springy so that one edge of the cover plate may be inserted in one groove and by pressure on the other edge of the plate it may be snapped into the opposite guide groove, or the cover plates may be inserted endwise into the grooves and slid along the same to their desired positions during the assembly of the parts. Whenever it is desired to remove one or more of the cover plates a screw driver or other flat edge tool may be inserted into one of the grooves behind the edge of the cover plate and the latter forced out of position.

The end of the conduit may be closed by a cap piece consisting of a metal stamping, casting or the like having a transverse wall 17 the edges of which have given reverse bends 18 to provide stops that abut the ends of the conduit walls in the manner shown in Figure 2 of the drawings. The remaining portions of the metal forming the end piece extend laterally away from the transverse wall plate 17 to provide sides 19 and a bottom plate 20 that fits within the walls of the conduit. The metal at the upper portion of end piece 17, after being given the reverse bend, is flanged inwardly a short distance as at 21 so as to extend under the lower flange 13 of the conduit. A nut and bolt device 22, passing through the bottom wall 10 of the conduit and the bottom plate 20 of the end closure piece, will maintain the parts in assembly.

The electrical unit, which is connected with the conductors 15 consists of a suitable porcelain insulating member 23 of such shape and size that it will fit within the conduit and it is provided with a socket portion 24 to receive an electric lamp or bulb 25 of the elongated tubular type. When mounted in the conduit the axes of the socket 24 and the lamp or bulb 25 extends longitudinally and centrally of the conduit in the manner shown in the drawings. The other end of the porcelain member, opposite the socket, is provided with terminal posts 26 to which adjacent portions of the conductor wires 15 are secured, and an insulating plate 27 is secured to this end face of the porcelain member 23 outside the terminals by bolt and nut devices 28 that pass through integral lugs 29 on the sides of the porcelain member.

The means for mounting the socket element in the conduit consists of an L-shaped plate that is secured to the porcelain member 23 by means of the bolt and nut devices 28 before mentioned. This plate is of metal that is bent intermediate its ends to provide an outer plate 30 and a transverse wall portion 31, the latter being provided with a central opening to fit around the socket formation 24 of the porcelain piece, and having its lower corner portions cut away and formed oblique as at 32 to accommodate the conductor wires 15 in the bottom of the conduit. At its upper corners the vertical wall portion 31 is notched to provide shoulders 33 that extend below the inner horizontal flanges 13 forming the grooves upon each side of the conduit opening and the wall portion 31 is of such height that its lower edge will engage the bottom wall 10 of the conduit in the manner shown in Figures 2 and 4. The notches or shoulders 33 assist in interlocking the structure with the flanges of the conduit.

The top plate portion 30 of this L-shaped piece has its remote transverse edge off-set to a lower plane so as to provide the stepped portion 34 that fits under the adjacent edge of one of the conduit cover plates 16. The side edges of the top plate portions 13 extend beyond the vertical planes of the side edges of the transverse wall portion 31 so as to provide longitudinal lips 35 that enter the re-entrant angle formed by the inner flanges 13 and 14 upon each side of the conduit opening. By engaging the shoulders 33 with the lower faces of flanges 13 and the lips 35 with the other or upper surfaces thereof, and said lips 35 entering the guide grooves, the socket member connected to the plate 30—31 may be assembled with the conduit as a unit and may be interlocked with the flanges on the conduit, while the edges of the lips enter the grooves formed by said flanges. As will be seen in Figure 8 the electric socket and the plate portion 30—31 form a single unitary structure to which portions of the conductors or wires 15 may be properly connected and this unit, as a whole, may be readily assembled or disassembled with the trough-like conduit.

A light reflecting device is placed in the conduit to reflect the light rays from the lamp or bulb outwardly away from the structure. This reflecting device preferably consists of a sheet of polished metal of a length slightly longer than the elongated lamp or bulb 25 and which is bent into a concave shape as indicated at 36 (Figure 6). The concave portion extends under or back of the lamp or bulb and receives the light rays therefrom and reflects them outwardly through the opening in the conduit.

The longitudinal edges of the metal strip forming the reflector are bent laterally to provide longitudinal lips 37 that rest upon the outer surfaces of the inner flanges 13 and the edges of which lips enter the grooves at the reentrant angle formed by the flanges 13 and 14.

One end of the reflector element preferably abuts the adjacent face of the transverse plate portion 31 forming part of the socket unit and its opposite end portion extends beyond the end of the lamp or bulb 25 as shown in Figures 1 and 2. The metal of this reflector unit is more or less springy or elastic which permits the ready removal or insertion of this unit in the conduit without removing the lamp or bulb, which may be done by merely moving the outer flanged portions towards each other to permit one or both of the lips 37 to disengage its respective groove.

A partition unit 38 is inserted transversely across the interior of the conduit at the end of the reflector unit that is remote to the socket unit. This partition unit 38 comprises a metal plate bent substantially L-shaped in cross section the larger member of which provides a partition wall 38 and the lateral or smaller portion provides the means for interlocking the unit with the flanges on the side of the conduit opening. The lower corner portions of the partition wall are cut oblique as at 39 to accommodate the conductors 15 and the upper corners of the wall are notched to provide shoulders 40, similar to shoulders 33 on the socket unit plate 31, to fit against or engage the under surface of the lower flange 13 at the conduit opening.

The transverse or horizontal portion of the plate forming a partition 38 is of sufficient width to provide means at its ends for interlocking engagement with the flanges at the sides of the conduit opening. The portion just mentioned is offset into three stepped planes 41, 42 and 43, all of which are horizontally disposed and the first plane 41 of which is at such location that the lugs or lips 41ª at the ends thereof will rest upon the upper surface of the flange 13 at the edges of the conduit opening and will extend into the grooves. The next stepped portion 42 corresponds substantially with the plane of the flange 13 and at the edges of the metal is cut away to provide recesses 42ª to position portion 42 between said flanges 13. The ends of the metal forming the third stepped portion 43 extends outwardly approximately the same distance as the lips 41ª and provide corresponding lips 43ª that extend under the flange 13 in the manner shown in Figure 5. The arrangement of the part forming the intermediate stepped portion 42 is also such that it will extend under the adjacent edge of the contiguous cover plate 16, as shown in Figure 2, so that a smooth upper surface is provided.

This partition wall member is also a separate unit and it is adapted to be placed in the conduit at any location desired, preferably in the position shown where it is against one end of the reflector unit. On account of its peculiar formation, the partition unit may be readily removed from the conduit, either by sliding the adjacent parts longitudinally, or removing the reflector unit, and then orienting the partition so that one of the lips 43ª will be disengaged from beneath its respective flange 13 in the manner shown in Figure 9.

From the foregoing it will be seen that the socket units may be placed at different locations along the length of the trough and connected in the usual manner to the conductors, after which the reflector units and the lamps are placed in position and the partition unit inserted at the end of the reflector opposite the socket unit. The spaces between the socket unit and the next unit, if it be a partition unit, may then be measured and a cover plate cut of such length as to fit the space and close this portion of the conduit opening. This operation is repeated for each open portion of the conduit except at the locations of the reflectors.

After the device has been in use it may be found that the amount of illumination may be diminished or it may be necessary to increase the amount of illumination. This may readily be done by removing one or more of the socket units with the reflector and the partition units and respace the remaining socket units farther apart. This will produce less illumination and the increased separation of the units will create gaps in the cover that may be either patched with a small strip of the cover plate or an entirely new piece may be cut of the required length. Obviously the same method may be practiced in supplying the structure with additional socket units and associated parts or accessories when increased illumination is required.

The structure as devised is capable of use in different lengths, depending upon the service required and where several lengths of conduit are used any suitable means may be provided for uniting adjacent ends of such conduit strips.

The structure I have disclosed is, of course, capable of various changes without departing from the principles involved. It is therefore to be understood that the drawings and the within description are for the purpose of clearness of understanding only, and no unnecessary limitations are to be understood therefrom, but the appended claims are to be construed as broadly as permissible in view of the prior art.

What I claim is:—

1. A device of the kind described comprising a trough having a longitudinal opening, an electric outlet unit housed in said trough, members on said unit that movably engage the inner and outer faces of the edges of said opening and interlock the unit in said trough, a concave reflector housed in said trough and abutting said outlet unit at one end, means for movably interlocking said reflector with the edges of said opening, and a wall movably mounted in said trough and abutting the opposite end of said reflector.

2. A device of the kind described comprising a trough having a longitudinal opening, grooved flanges projecting towards each other on opposite sides of said opening, an electric outlet unit housed in said trough, members on said unit that enter said grooves and engage inner and outer faces thereof to maintain said unit in assembly with said trough, a concave reflector housed in said trough alongside said unit, and members on said reflector that enter said grooves and maintain said reflector in movable relation to said trough and outlet unit.

3. A device of the kind described comprising a trough having a longitudinal opening, grooved flanges projecting towards each other on opposite sides of said opening, an electric socket unit housed in said trough with its outlet facing longitudinally thereof, a plate on said unit that engages inner and outer faces of said flanges to movably position said unit in said trough, an elongated concave reflector extending from said socket longitudinally of the trough, and lips on the edges of said reflector that engage portions of said flanges and movably position said reflector in said trough.

4. A device of the kind described comprising a trough having a longitudinal opening, grooved flanges projecting towards each other on opposite sides of said opening, an electric socket unit housed in said trough with its outlet facing longitudinally thereof, a plate on said unit that engages inner and outer faces of said flanges to movably position said unit in said trough, an elongated concave reflector extending from said socket longitudinally of the trough, means for movably interlocking said reflector with said flanges, and a transverse wall at the end of the reflector farthest from the socket unit.

5. A device of the kind described comprising a trough having a longitudinal opening, grooved flanges projecting towards each other on opposite sides of said opening, an electric socket unit housed in said trough with its outlet facing longitudinally thereof, a plate on said unit that engages inner and outer faces of said flanges to movably position said unit in said trough, an elongated concave reflector extending from said socket longitudinally of the trough, means for movably interlocking said reflector with said flanges, a transverse partition extending across said trough at the end of the reflector farthest from said socket unit, and means for movably interlocking said partition with said flanges.

6. A device of the kind described comprising a trough-like conduit having a longitudinal opening, substantially V-shaped flanges extending along the edges of said opening, the re-entrant angle formed by the V-shape providing guide-grooves that face each other, a member housed in said conduit, lips and shoulders on the sides of said member said lips entering said guide-grooves and said shoulders being disposed below said lips to engage the undersides of the flanges forming said guide grooves, whereby said member is removably maintained in said conduit and is capable of movement longitudinally thereof.

7. A device of the kind described comprising a trough-like conduit having a longitudinal opening, substantially V-shaped flanges extending along the edges of said opening, the re-entrant angle formed by the V-shape providing facing guide-grooves, a member housed in said conduit, lips and undercut shoulders on the edges of said member adjacent said flanges which lips enter said guide-grooves and said shoulders being below said lips to engage the under surface of the lowermost members of said flanges, said lips and shoulders providing elements that interlock with said flanges to maintain said member against displacement from said conduit and permit the member to be readily moved longitudinally therein.

8. A device of the kind described comprising a trough-like conduit having a longitudinal opening, substantially V-shaped flanges extending along the edges of the opening, the re-entrant angle formed by the V-shape providing facing guide-grooves, an electric socket unit housed in said conduit, an electric lamp in said socket unit and extending longitudinally within said conduit, overhanging lips on the outer portion of said unit that enter the respective guide-grooves, undercut shoulders on said unit back of the lips that engage the inner elements of the flanges to prevent dislodgment of the socket unit, an elongated semi-cylindrical reflector within said conduit and extending longitudinally away from said socket unit behind said lamp, lateral longitudinal lips on said reflector that engage said flanges, a transverse partition in said conduit at the remote end of said reflector, and means for removably attaching said partition to said flanges.

9. A device of the kind described comprising a trough-like conduit having a longitudinal opening, flanges extending along the edges of said opening, an elongated concave reflector housed in said conduit, and having its longitudinal edges engaged with said flanges, transverse plates closing the ends of said reflector, lateral extensions on the outer portions of said plates and disposed in substantially the plane of said flanges, and stop members on the edges of the plates nearest the flanges, said stop members separated in different planes and adapted to engage respectively the upper and lower surfaces of the adjacent flange and thereby maintain said plates against accidental dislodgment.

10. A device of the kind described comprising a trough having a longitudinal opening, flanges projecting towards each other from opposite sides of the opening, an electric outlet unit housed in said trough, members on said unit that movably engage portions of said flanges and removably interlock the unit in said trough, a concave reflector housed in said trough and abutting said outlet unit at one end, means for interlocking said reflector with said flanges, and a wall movably mounted in said trough and abutting the end of said reflector opposite said outlet unit.

PERRY S. STRANG.